(12) United States Patent
Chiang et al.

(10) Patent No.: US 7,719,518 B2
(45) Date of Patent: May 18, 2010

(54) COMPUTER PERIPHERAL DEVICE (75) Inventors: Hsiao-Lung Chiang, Taipei (TW); Hong-Che Yen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 905 days.

(21) Appl. No.: 11/456,035

(22) Filed: Jul. 6, 2006

(65) Prior Publication Data
US 2007/0268252 A1 Nov. 22, 2007

(30) Foreign Application Priority Data
May 19, 2006 (TW) ............................... 95117794 A (51) Int. Cl.
*G09G 5/00* (2006.01)
*G09G 5/08* (2006.01)
*G06F 3/033* (2006.01)
*H01R 3/00* (2006.01)
*H01H 19/20* (2006.01)
*H04M 1/00* (2006.01)

(52) U.S. Cl. ...................... 345/163; 345/156; 439/500; 200/571; 455/575.1

(58) Field of Classification Search ......... 345/156–163; 439/12–13, 20–31, 135–150, 166–175
See application file for complete search history.

(56) References Cited
U.S. PATENT DOCUMENTS
5,186,652 A * 2/1993 Hai-Yung ................... 439/500

6,658,272 B1 * 12/2003 Lenchik et al. ........... 455/575.1
7,232,972 B1 * 6/2007 Yang .......................... 200/571
2006/0238496 A1 * 10/2006 Jin et al. ..................... 345/156

* cited by examiner

*Primary Examiner*—Sumati Lefkowitz
*Assistant Examiner*—Charles Hicks
(74) *Attorney, Agent, or Firm*—Apex Juris, PLLC; Tracy M Heims (57) ABSTRACT

A computer peripheral device includes a first housing, a second housing, a connecting member and a judging circuit. The connecting member is made of a conducting material and includes a rotating shaft. The second housing is rotatable relative to the first housing with rotation of the rotating shaft, so that the computer peripheral device is switched between a first configuration and a second configuration. The judging circuit includes a first conducting contact and a second conducting contact. The judging circuit activates a first function when the computer peripheral device is adjusted to the first configuration such that the first conducting contact is electrically connected to the second conducting contact through the connecting member. The judging circuit activates a second function when the computer peripheral device is adjusted to the second configuration such that the electrical connection between the first conducting contact and the second conducting contact is interrupted.

6 Claims, 7 Drawing Sheets

COMPUTER PERIPHERAL DEVICE

FIELD OF THE INVENTION

The present invention relates to a computer peripheral device, and more particularly to a computer peripheral device operated in different function modes by switching the configurations thereof.

BACKGROUND OF THE INVENTION

Nowadays, cursor control devices such as mice become essential input devices of computer systems. By using a mouse, a cursor is moved to a command option on a screen, so that the user can input instructions to control processing operations of the computer system. With increasing demands of using the mouse as the control device of the computer system, the functions, the appearances and the user-friendliness of the mouse are improved and associated technologies are well established. For example, the mechanism for sensing the moving direction and the displacement of the mouse is shifted from a trackball mechanism to an optical sensing mechanism. Furthermore, the method for transmitting signals is advanced from the wired signal transmission technology to the wireless transmission technology. For practicability, a scroll wheel assembly is arranged between two click buttons.

Figure 1:
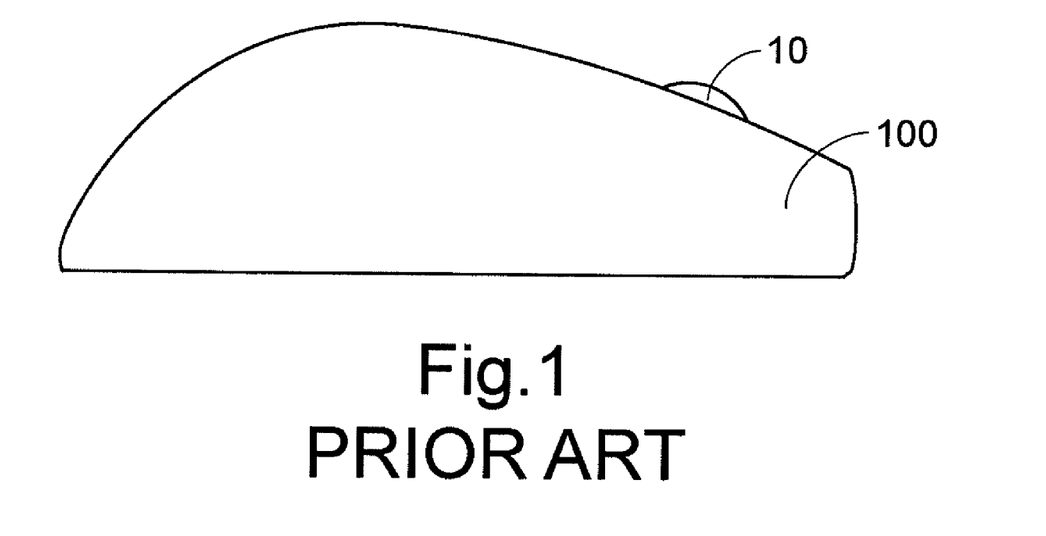
FIG. 1 is a schematic perspective view illustrating a conventional mouse.
Figure 2:
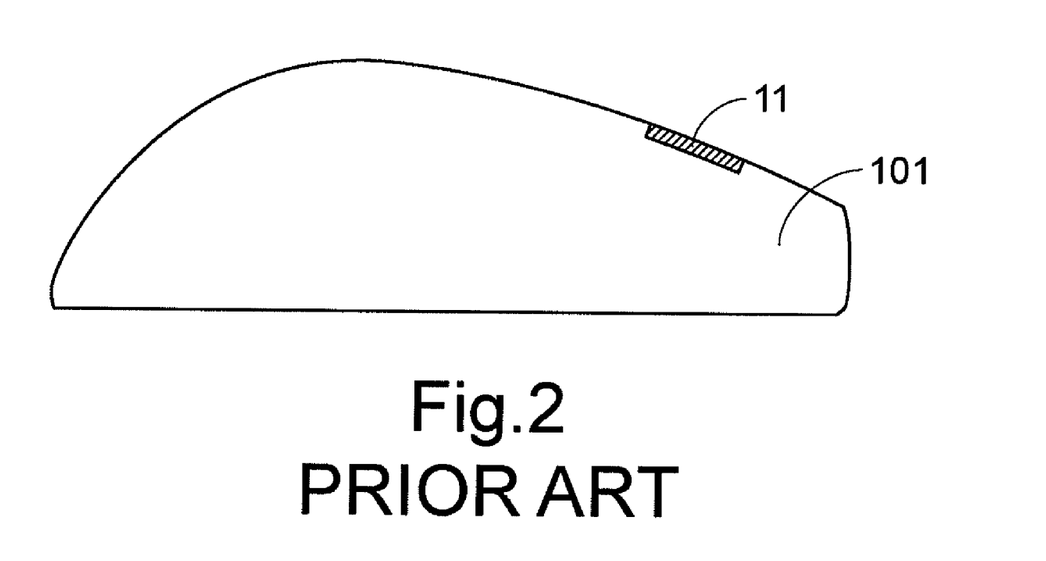
FIG. 2 is a schematic perspective view illustrating another conventional mouse.

Conventionally, the scroll wheel assembly is roatable in either a forward direction or a backward direction to scroll the image upwardly or downwardly. For minimization, another type of mouse having a thin film switch array is commercially available. By touching the thin film switch array, such a mouse has the functions identical to those activated by rotating the scroll wheel assembly. Referring to FIGS. 1 and 2, schematic perspective views of two conventional mice are shown. The mouse 100 of FIG. 1 has a scroll wheel assembly 10. The mouse 101 of FIG. 2 has a thin film switch array 11 in replace of the scroll wheel assembly. As shown in FIGS. 1 and 2, since the level of the mouse 101 relatively to the desk plane is lower than that of the mouse 100 having the scroll wheel assembly 10, the mouse 101 is slimmer.

Figure 3A:
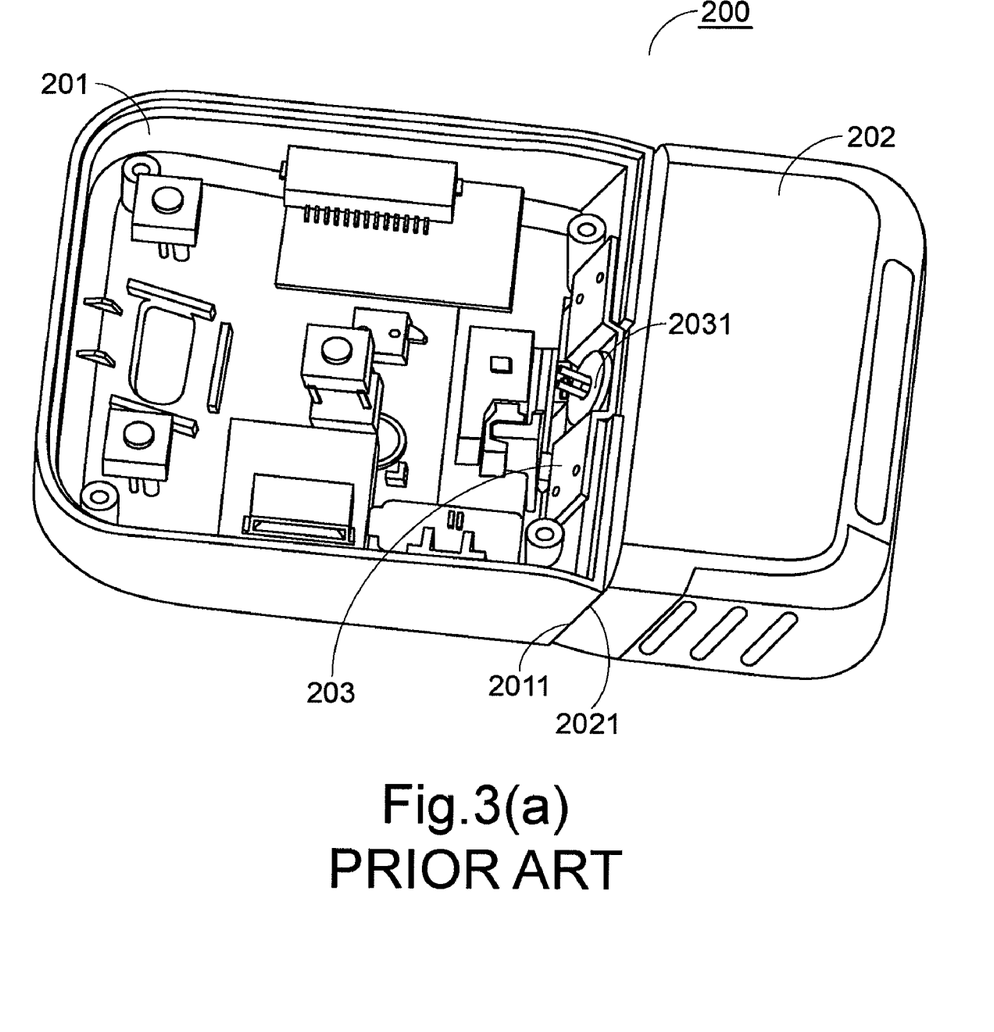
FIG. 3(a) is a schematic perspective view illustrating a conventional slim mouse.
Figure 3B:
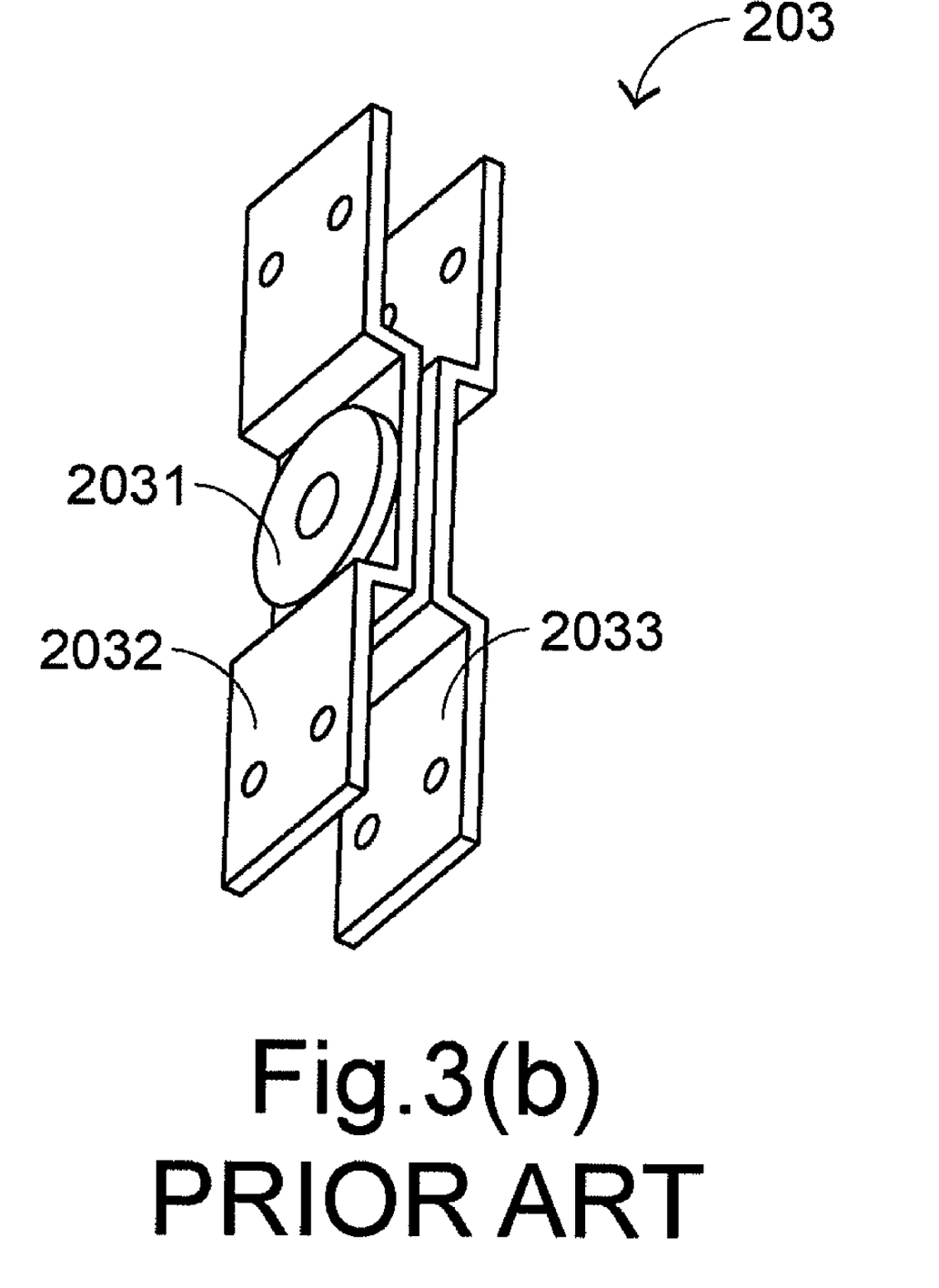
FIG. 3(b) is a schematic perspective view illustrating a connecting member used in the slim mouse of FIG. 3(a)

For minimization, a slim mouse was disclosed in a co-pending Taiwanese Patent Application No. 95107510, which was filed by the same assignee of the present application on Mar. 7, 2006, and the contents of which are hereby incorporated by reference. Referring to FIG. 3(a), a schematic perspective view of the slim mouse disclosed in Taiwanese Patent Application No. 95107510 is illustrated. The slim mouse 200 as shown in FIG. 3(a) comprises a first housing 201, a second housing 202 and a connecting member 203. The first housing 201 includes a first slant 2021. The second housing 202 includes a second slant 2022. Via the connecting member 203, the first housing 201 is coupled with the second housing 202. The connecting member 203 has a rotating shaft 2031. By means of the rotating shaft 2031, the second housing 202 is rotatable relative to the first housing 201. Please also refer to FIG. 3(b), which is a schematic perspective view of the connecting member 203. As shown in FIG. 3(b), the connecting member 203 further includes a first connecting plate 2032 and a second connecting plate 2033. The first connecting plate 2032 and the second connecting plate 2033 are fixed onto the first slant 2021 and the second slant 2022, respectively. The first connecting plate 2032 is coupled to the second connecting plate 2033 via the rotating shaft 2031, such that the second connecting plate 2033 is rotatable relative to the first connecting plate 2032. As a consequence, the second housing 202 is rotatable relative to the first housing 201 via the rotating shaft 2031. The operating mechanism of the slim mouse 200 will be illustrated in more details with reference to FIGS. 4(a)~4(c).

Figure 4A:
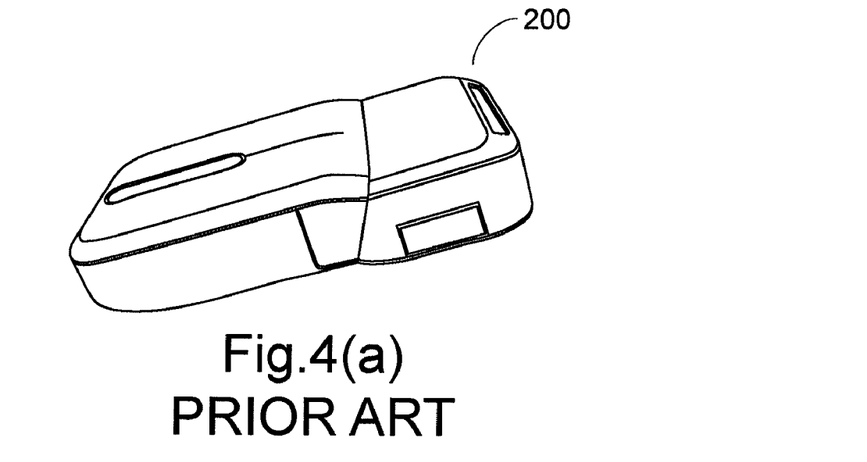
FIGS. 4(a)~4(b) are schematic views illustrating the operating mechanism of the conventional slim mouse.
Figure 4B:
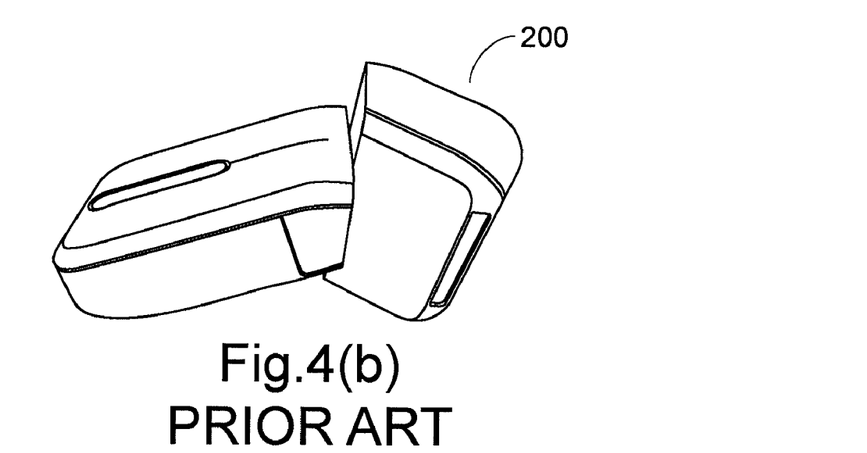
Figure 4C:
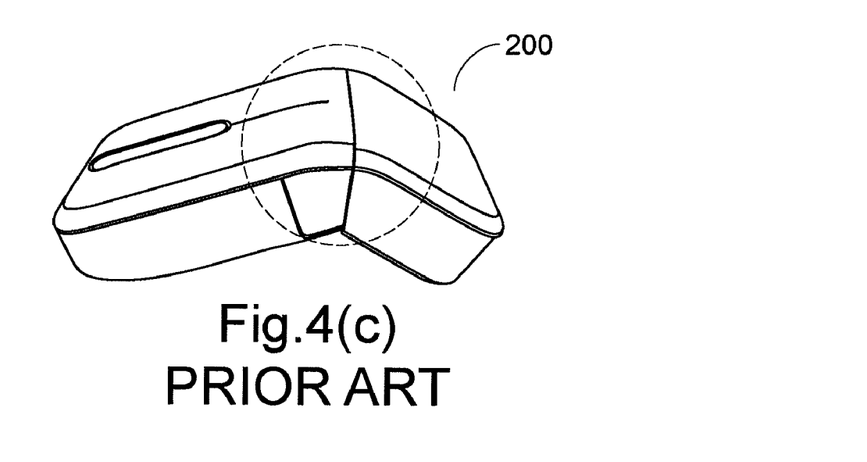

Referring to FIGS. 4(a)~4(c), the operating mechanism of the slim mouse 200 is schematically illustrated. In a case that the slim mouse 200 is not acted as the cursor control device to be moved on the desk plane, the first slant 2021 of the first housing 201 is in contact with the second slant 2022 of the second housing 202. Under this circumstance, the slim mouse 200 has a flat configuration and the volume of the slim mouse 200 is reduced, as is shown in FIG. 4(a). If the user intends to move the mouse on the desk plane, the second housing 202 should be rotated, as is shown in FIG. 4(b). After the second housing 202 is rotated by 180 degrees, the first slant 2021 of the first housing 201 is in contact with the second slant 2022 of the second housing 202 again, as is shown in FIG. 4(c). Due to the contact between the first slant 2021 and the second slant 2022, the slim mouse has a cambered configuration as is indicated in the dashed circle. Under this circumstance, the slim mouse 200 can be used as a cursor control device to be moved on the desk plane when the user's hand is placed on the cambered surface. Therefore, the slim mouse 200 may function as either a cursor control device or a remote controller by switching the configuration between a flat configuration and a cambered configuration.

This slim mouse 200, however, still has some drawbacks. For example, when the slim mouse 200 functions as a remote controller by adjusting the configuration to be flat, the function of using as a cursor control device is still enabled. In other words, even though the functions involving the cursor control device are not needed, power is continuously supplied to the components associated with the mechanism of the cursor control device. Under this circumstance, the power consumption of the battery inside the slim mouse 200 is considerable.

In views of the above-described disadvantages resulted from the prior art, the applicant keeps on carving unflaggingly to develop a computer peripheral device according to the present invention through wholehearted experience and research.

SUMMARY OF THE INVENTION

It is an object of the present invention to provide a computer peripheral device operated in different function modes by switching the configurations thereof.

In accordance with an aspect of the present invention, there is provided a computer peripheral device. The computer peripheral device comprises a first housing, a second housing, a connecting member and a judging circuit. The connecting member is used for connecting the first housing and the second housing. The connecting member is made of a conducting material and includes a rotating shaft. The second housing is rotatable relative to the first housing with rotation of the rotating shaft, so that the computer peripheral device is switched between a first configuration and a second configuration. The judging circuit is disposed inside the first housing and includes a first conducting contact and a second conducting contact. The judging circuit activates a first function when the computer peripheral device is adjusted to the first configuration such that the first conducting contact is electrically connected to the second conducting contact through the connecting member. The judging circuit activates a second function when the computer peripheral device is adjusted to the second configuration such that the electrical connection between the first conducting contact and the second conducting contact is interrupted.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 5:
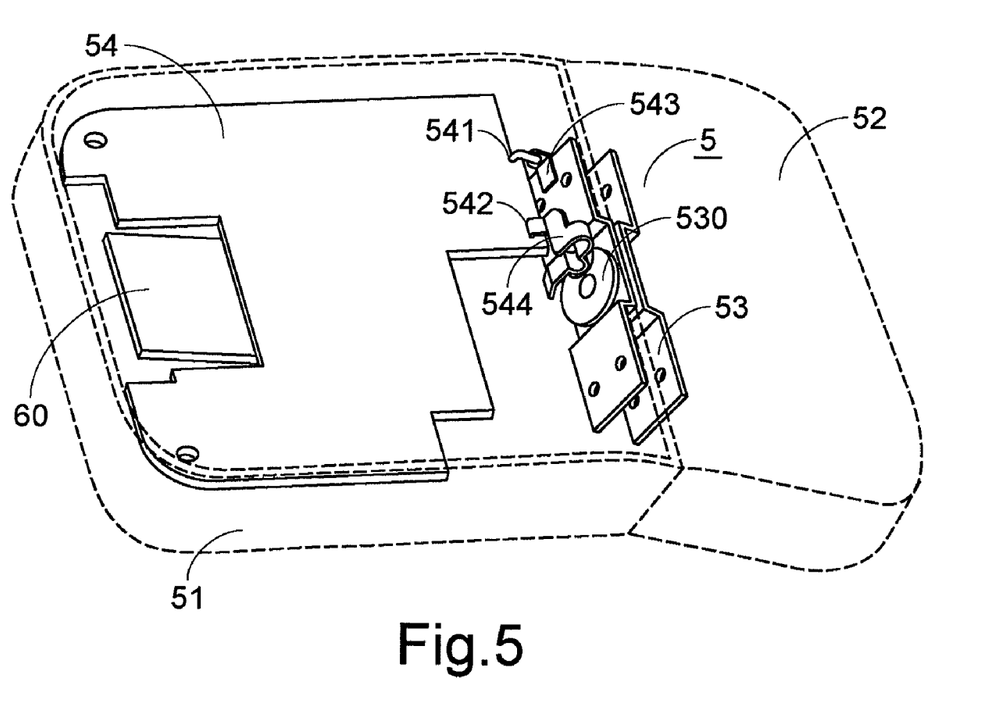
FIG. 5 is a schematic perspective view of a cursor control device according to a preferred embodiment of the present invention.

Referring to FIG. 5, a schematic perspective view of a computer peripheral device according to a preferred embodiment of the present invention is illustrated. An exemplary computer peripheral device is a cursor control device 5. The cursor control device 5 as shown in FIG. 5 comprises a first housing 51, a second housing 5, a connecting member 53 and a judging circuit 54. The cursor control device 5 further includes an optical sensor 60 inside the first housing 51 and triggered to generate a cursor control signal. A receptacle (not shown) is defined within the second housing 52 for accommodating at least a battery (not shown) therein. The connecting member 53 is made of a conducting material. Via the connecting member 53, the first housing 51 is coupled with the second housing 52. The connecting member 33 has a rotating shaft 530. By means of the rotating shaft 530, the second housing 52 is rotatable relative to the first housing 51. Likewise, since the second housing 52 is rotatable relative to the first housing 51, the cursor control device 5 may be switched between a cambered configuration (as shown in FIG. 4(c)) and a flat configuration (as shown in FIG. 4(a)) according to the user's requirement.

Moreover, the judging circuit 54 is arranged inside the first housing 51, and includes a first conducting contact 541 and a second conducting contact 542. Selectively, the first conducting contact 541 and the second conducting contact 542 are electrically connected to the connecting member 53 through a first flexible metallic plate 543 and a second flexible metallic plate 544, respectively.

A major feature of the present invention will be illustrated in more details as follows. In a case that the second housing 52 is rotated relative to the first housing 51 with rotation of the rotating shaft 530 such that the cursor control device 5 has a cambered configuration, the first conducting contact 541 is electrically connected with the second conducting contact 542 through the connecting member 53. Under this circumstance, the judging circuit 54 will activate the function of controlling cursor movement. In another case that the second housing 52 is rotated relative to the first housing 51 with rotation of the rotating shaft 530 such that the cursor control device 5 has a flat configuration, the connecting member 53 is not electrically interconnected between the first conducting contact 541 and the second conducting contact 542. Under this circumstance, the judging circuit 54 will activate the function as a remote controller. As a consequence, the cursor control device 5 can be operated in different function modes by switching the configurations thereof. Moreover, when the cursor control device 5 is operated in a function mode, the other function mode is disabled, and thus the power consumption of the battery is saved.

Figure 6:
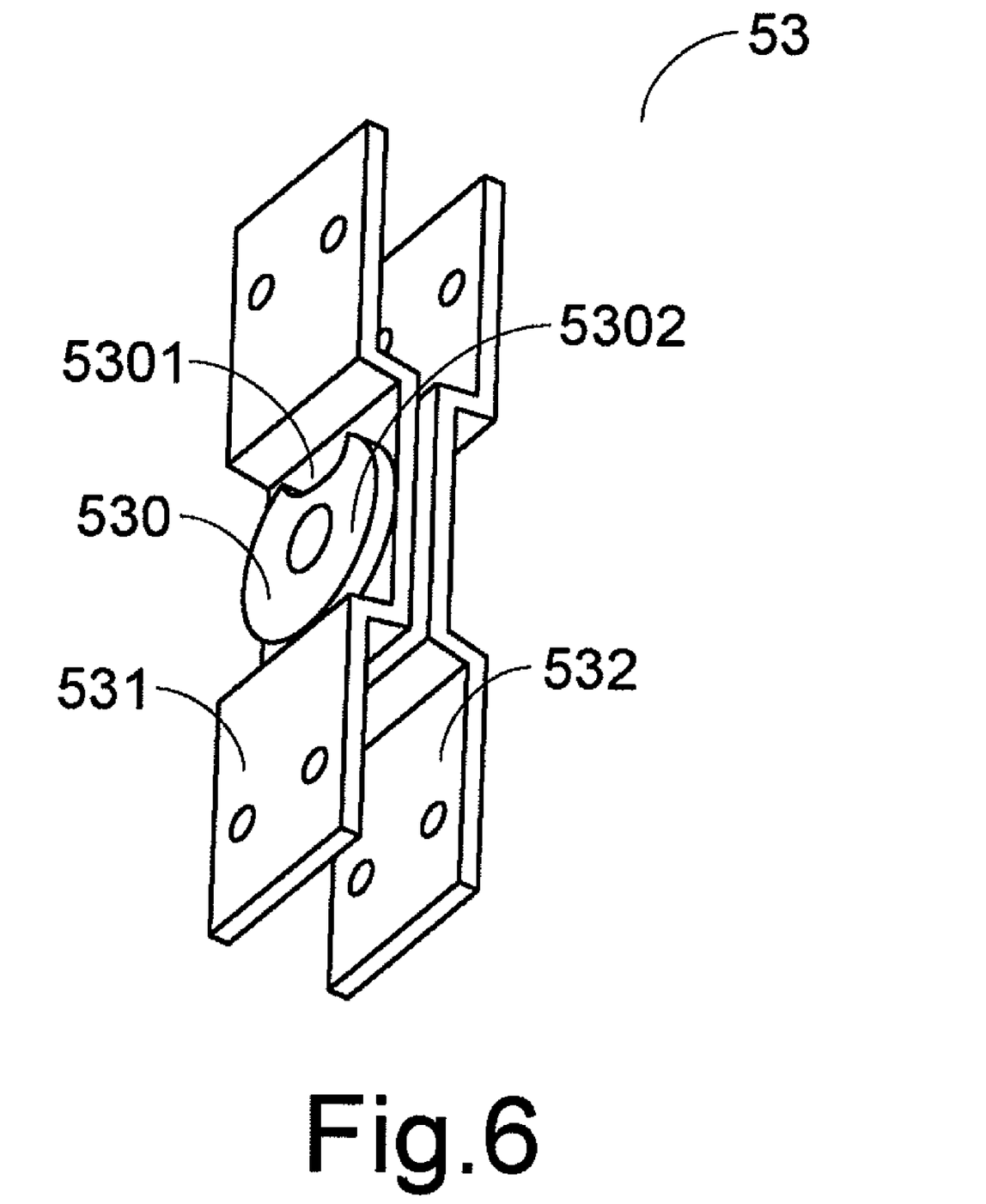
FIG. 6 is a schematic perspective view illustrating a connecting member used in the cursor control device of FIG. 5.

Referring to FIG. 6, a schematic perspective view of the connecting member 53 used in the cursor control device 5 of the present invention is illustrated. In addition to the rotating shaft 530, the connecting member 53 further includes a first connecting plate 531 and a second connecting plate 532. The first connecting plate 531 and the second connecting plate 532 are fixed onto the first housing 51 and the second housing 52, respectively. The first connecting plate 531 is coupled to the second connecting plate 532 via the rotating shaft 530, such that the second connecting plate 532 is rotatable relative to the first connecting plate 531 and the second housing 52 is rotatable relative to the first housing 51 via the rotating shaft 530. As shown in FIG. 6, a rotating surface 5302 of the rotating shaft 530 further includes a notch 5301. When the second housing 52 is rotatable relative to the first housing 51, the notch 5301 is also rotated to different positions. Depending on the positions of the notch 5301, the first conducting contact 541 is electrically connected with the second conducting contact 542 through the connecting member 53 or electrically disconnected from the second conducting contact 542. The related principles will be illustrated in more details as follows.

Figure 7A:
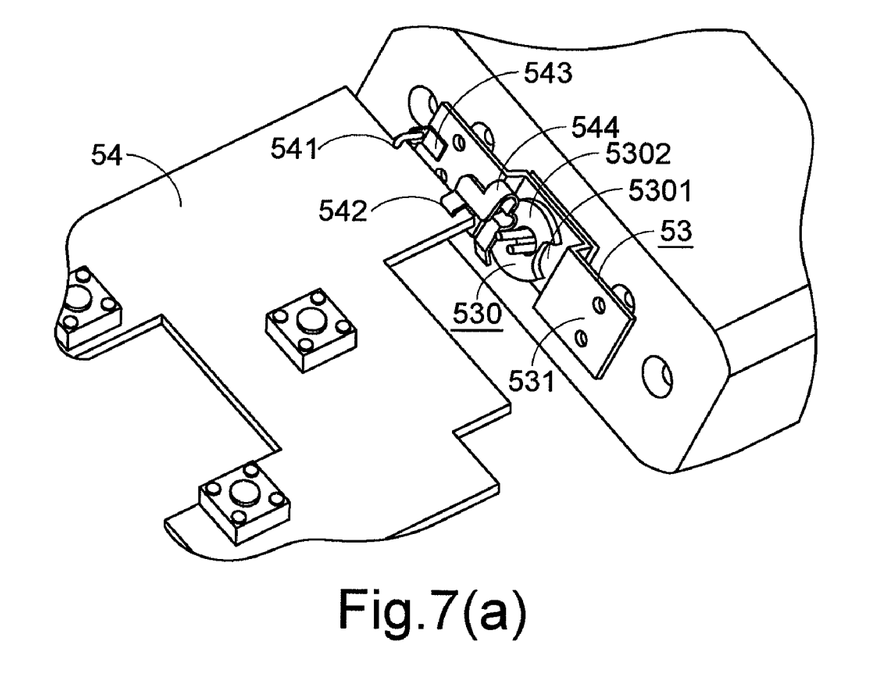
FIGS. 7(a) and 7(b) are partially schematic perspective views illustrating electrical connection and electrical disconnection between the first conducting contact and the second conducting contact.
Figure 7B:
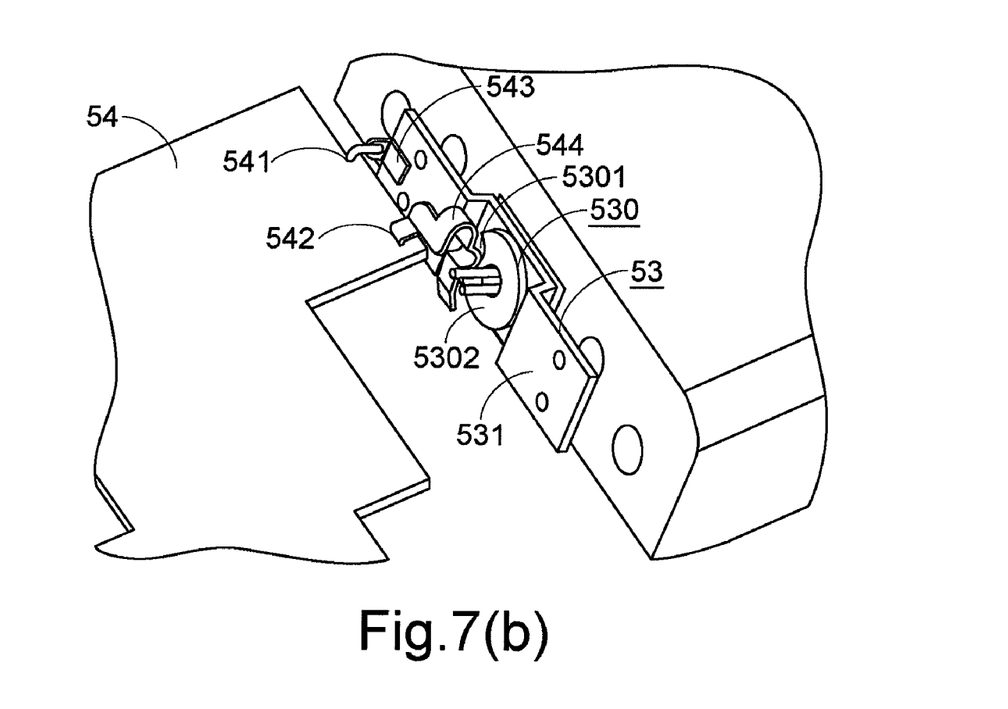

Please refer to FIGS. 7(a) and 7(b), which are partially schematic perspective views illustrating electrical connection and electrical disconnection between the first conducting contact 541 and the second conducting contact 542. As shown in FIG. 7(a), in the case that the second housing 52 is rotated relative to the first housing 51 such that the cursor control device 5 has a cambered configuration, the notch 3201 of the rotating surface 5302 of the rotating shaft 530 is rotated to a first position, which is distant from the second flexible metallic plate 544. Under this circumstance, the first flexible metallic plate 543 is in contact with the first connecting plate 531 of the connecting member 53, and the second flexible metallic plate 544 is in contact with the rotating surface 5302 of the rotating shaft 530. Consequently, the first conducting contact 541 is electrically connected to the second conducting contact 542 through the connecting member 53, so that the judging circuit 54 will activate the function of controlling cursor movement. As shown in FIG. 7(b), in another case that the second housing 52 is rotated relative to the first housing 51 such that the cursor control device 5 has a flat configuration, the notch 3201 of the rotating surface 5302 of the rotating shaft 530 is rotated to a second position, which is next to the second flexible metallic plate 544. When the notch 3201 is rotated to the second position, the second flexible metallic plate 544 is received in the notch 3201 but separated from the rotating surface 5302 of the rotating shaft 530. Under this circumstance, the connecting member 53 is not electrically interconnected between the first conducting contact 541 and the second conducting contact 542, so that the judging circuit 54 will activate the function as a remote controller. Since the power supplied to the optical sensor for detecting of the cursor control signal is interrupted, the function of controlling cursor movement is disabled and the power consumption of the battery is saved.

In the above embodiments, when the cursor control device 5 is adjusted to have the cambered configuration and the first conducting contact 541 is electrically connected to the second conducting contact 542, the cursor control device 5 is operated in a first mode to control cursor movement. Whereas, when the cursor control device 5 is adjusted to have the flat configuration and the connection between the first conducting contact 541 and the second conducting contact 542 is interrupted to save power, the cursor control device 5 is operated in a second mode and acted as a remote controller. It is noted that, however, those skilled in the art will readily observe that numerous modifications and alterations may be made while retaining the teachings of the invention. For example, when the cursor control device 5 is adjusted to have cambered configuration and the connection between the first conducting contact 541 and the second conducting contact 542 is interrupted, the cursor control device 5 can be operated in a first mode to control cursor movement; and when the cursor control device 5 is adjusted to have the flat configuration and the connection between the first conducting contact 541 and the first conducting contact 541 is electrically connected to the second conducting contact 542, the cursor control device 5 is operated in a second mode to be acted as a remote controller and the power supplied to the optical sensor is interrupted for reducing power consumption. Accordingly, the above disclosure should be limited only by the bounds of the following claims.

From the above description, the cursor control device of the present invention can be operated in different function modes by switching the configurations thereof. By rotating the second housing relative to the first housing, the cursor control device of the present invention can be switched between a cambered configuration like a mouse and a flat configuration like a remote controller. Moreover, the judging circuit of the cursor control device will activate either the function of controlling cursor movement or the function as a remote controller according to the configuration of the cursor control device. When the cursor control device is used the remote controller, the power supplied to the optical sensor is interrupted, so that the power consumption is reduced. More especially, by adjusting the notch of the rotating surface between a first position and a second position with rotation of the rotating shaft, the first conducting contact is electrically connected to or separated from the second conducting contact. Therefore, the drawbacks occurred in the prior art are overcome.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer peripheral device comprising:
a first housing;
a second housing;
a connecting member for connecting said first housing and said second housing, said connecting member being made of a conducting material and including a first connecting plate, a second connecting plate fixed onto said first housing and said second housing respectively and a rotating shaft with a rotating surface having a notch thereon, wherein said second housing is rotatable relative to said first housing with rotation of said rotating shaft, so that said computer peripheral device is switched between a first configuration and a second configuration, and wherein the first configuration is a cambered configuration or a flat configuration, and the second configuration is a cambered configuration or a flat configuration; and
a judging circuit disposed inside said first housing and including a first conducting contact electrically connected to said first connecting plate through a first flexible metallic plate and a second conducting contact selectively connected to said rotating surface of the rotating shaft through a second flexible metallic plate, wherein said judging circuit activates a first function when said computer peripheral device is adjusted to said first configuration such that said first conducting contact is electrically connected to said second conducting contact through said rotating surface of the rotating shaft, and said judging circuit activates a second function when said computer peripheral device is adjusted to said second configuration such that the second flexible metallic plate is received in the notch and the electrical connection between said first conducting contact and said second conducting contact is interrupted.

2. The computer peripheral device according to claim 1 wherein said first configuration is a cambered configuration, and said first function is activated by said judging circuit to control cursor movement.

3. The computer peripheral device according to claim 1 wherein said second configuration is a flat configuration, and said second function activated by said judging circuit to execute remote control.

4. The computer peripheral device according to claim 1 wherein said second configuration is a cambered configuration, and said second function is activated by said judging circuit to control cursor movement.

5. The computer peripheral device according to claim 1 wherein said second configuration is a flat configuration, and said second function activated by said judging circuit to execute remote control.

6. The computer peripheral device according to claim 1 wherein said computer peripheral device is a cursor control device, and further comprises:
an optical sensor arranged inside said first housing for generating a cursor control signal; and
a receptacle defined within said second housing for accommodating at least a battery therein.

* * * * *